United States Patent [19]

Donovan

[11] Patent Number: 5,007,488
[45] Date of Patent: Apr. 16, 1991

[54] DRILLING NIPPLE GAS TRAP

[75] Inventor: William S. Donovan, Littleton, Colo.

[73] Assignee: Donovan Brothers Incorporated, Littleton, Colo.

[21] Appl. No.: 524,163

[22] Filed: May 16, 1990

[51] Int. Cl.⁵ .............................................. E21B 21/00
[52] U.S. Cl. ...................................... 175/59; 175/66; 175/206; 175/209
[58] Field of Search ...................... 175/58, 59, 66, 206, 175/207, 209

[56] References Cited

U.S. PATENT DOCUMENTS 3,417,830  12/1968  Nichols ............................... 175/209
3,965,998   6/1976  Gyongyosi et al. ................. 175/209

Primary Examiner—William P. Neuder

[57] ABSTRACT

The present invention is a gas sampling device. A gas sampling tube and pump withdraw gas which evolves into the atmosphere as the drilling fluid in the annular space exits the wall bore. Drilling fluid and debris which may be entrained in the gas sample are separated by gravity settling in a separation device. A purge line may be used to agitate drilling mud and force gas toward the gas sampling tube.

15 Claims, 3 Drawing Sheets

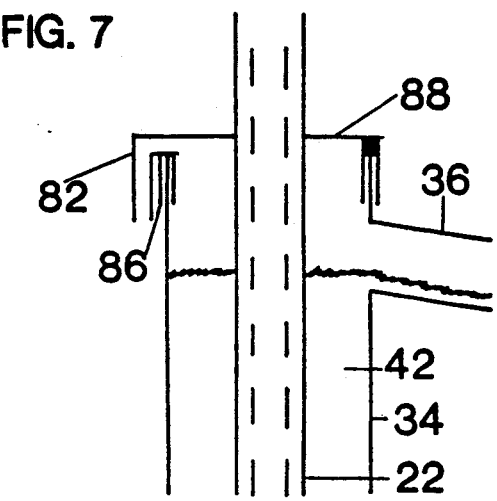
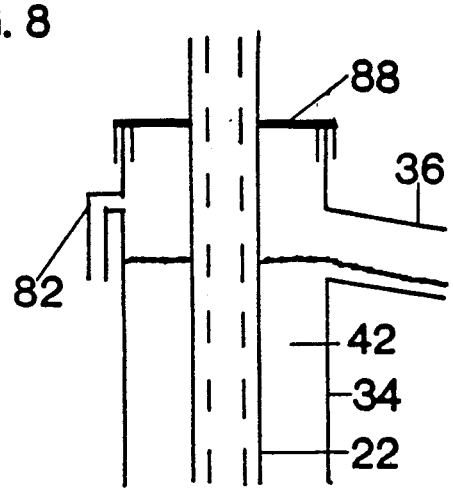
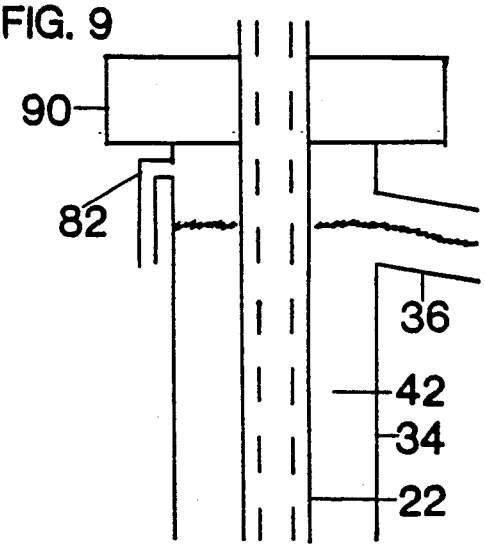
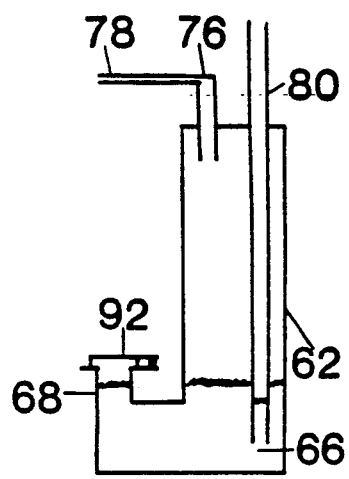
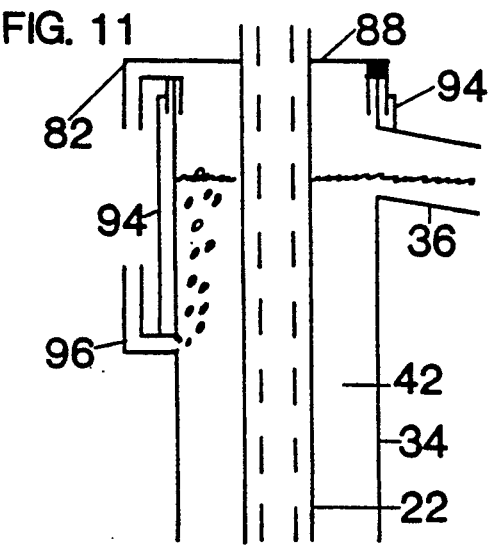

DRILLING NIPPLE GAS TRAP

FIELD OF THE INVENTION

This invention relates to wells drilled in the earth and more particularly to the sampling of gas entrained in the drilling fluids.

BACKGROUND OF THE INVENTION

The rotary drilling process creates a borehole in the earth by use of a drill bit which is attached to a drill stem, The drill bit and drill stem are lowered and rotated into the earth creating a bore hole by breaking, abrading and fracturing the earth beneath the drill bit. During this process drilling fluid is circulated by means of a pump down the inside of the drill stem and up the annular space between the outside of the drill stem and the wall of the bore hole, the drilling mud is typically a mixture of water and clay, but other drilling muds such as diesel oil, foam, and air have been used. Materials which are products of the drilling process such as rock chips (cuttings and cavings), pieces of casing, cement, the drill stem, hydrocarbon gases such as, but not limited to methane, ethane, propane, other gases associated with hydrocarbon gases such as, but not limited to carbon dioxide and hydrogen sulfide and oil are entrained in the drilling fluid as it circulates from the drill bit up the annular space between the outside of the drill stem and the borehole wall.

Other functions of the drilling fluid include cooling and lubricating the bit and maintaining a hydrostatic pressure on the bore hole which is greater than the pressure in the earth. This hydrostatic pressure prevents uncontrolled flows of oil, gas and water from the earth into the borehole.

Gas mudlogging is a technique for determining the amount and constituent components of the gas which entrained in the drilling fluid. Heretofore, gas was sampled by a mechanically agitated device called a gas trap, which was placed in the shale shaker box. The gas extracted from the gas trap was mixed with air and drawn though tubing to a gas analyzer. The typical gas analyzers used in mudlogging are flame ionization detectors (FID), catalytic combustion detectors (hot wires) and thermal conductivity detectors (TDC). Constituent components of the entrained gas are typically analyzed by chromatography.

Difficulties in assuring good gas sample quality and consistency have been known and studied for many years. The major difficulty of gas sampling has involved the placement and efficiency of the gas trap. Placement within the shaker box and depth of placement of the gas trap in the drilling mud caused major variations in sampling efficiency.

During drilling the shale shaker is often bypassed and the mud level in the shaker box drops to a level which causes the gas trap to be out of the drilling mud. Common reasons for bypassing the shale are to build viscosity by allowing drilled native clay to be recirculated, allowing lost circulation material which is larger than the shale shaker screen to remain in the drilling mud and the failure of gates in the mud tanks to close properly.

Conversely, slugs of drilling mud caused by raising and lowering the drill stem, air trapped in the drill stem and gas, water or oil entering the well bore can cause the level in the shaker box to rise rapidly causing a blockage of the gas trap exhaust port, covering the motor which drives the mechanical agitator, and the drawing of drilling mud into the sample tubing. Drilling mud in the sample tubing causes blockage, damage to the gas analyzers which are designed for a gas environment, and variation in the gas sample rate which adversely affects the accurate measurement of the gas.

Gas traps are typically designed with a mechanical agitator which is rotated by an electric or air driven motor. The environment above the shale shaker box is rated as Class 1, Division 1, Group D by the American Pertroleum Institute. In these environments ignitible concentrations of flammable gases or vapors can exist under normal operating conditions. This requires special procedures and equipment. The agitator with electrical motors must be rated as explosion proof. Many gas traps use air motors to rotate the agitators. This practice reduces the potential danger of electrical sparking. However bearing failure is common in both electrical and air motors and this can cause sparking.

Electrical gas trap motors are turned off when the electrical generator is turned off for repair and maintenance. Smaller drilling rigs typically turn off the electricity during day light hours to save on expenses.

Air motor gas traps are turned off when the rig compressor is turned off for repair and maintenance. Air motors which are driven by rig compressors do not rotate at a constant speed due to fluctuations in air use on the rig. During cold weather water in the air supply often freezes causing the air motor and agitator to stop rotating.

During cold weather drilling mud and condensed water in the gas sample tubing freeze and stop or constrict the gas sample flow. The shale shaker box and the gas trap are usually not enclosed, insulated or heated in cold weather.

The placement of the gas trap in the shale shaker box and the ancillary tubing lines and hoses are often moved by drilling rig personnel during normal maintenance of the shale shaker, desilters, desander, degasser and other drilling mud conditioning equipment. Often the drilling rig personnel disconnect or alter the gas trap configuration to accomplish normal rig maintenance. This adversely affects the quality of the gas sample.

SUMMARY OF THE INVENTION

The present invention is a gas sampling device. A gas sampling tube and pump withdraw gas which evolves into the atmosphere as the drilling fluid in the annular space exits the well bore. Drilling fluid and debris which may be entrained in the gas sample are separated by gravity settling in a separation device. A purge line may be used to agitate drilling mud and force gas toward the gas sampling tube.

BRIEF DESCRIPTION OF THE DRAWINGS

FIG. 7 through FIG. 9 illustrate some possible configurations of the gas channeling devices FIG. 10 illustrates a possible configuration of the separation device.

FIG. 11 illustrates a configuration using the purge line.

DESCRIPTION OF THE PREFERRED EMBODIMENT

Figure 1:
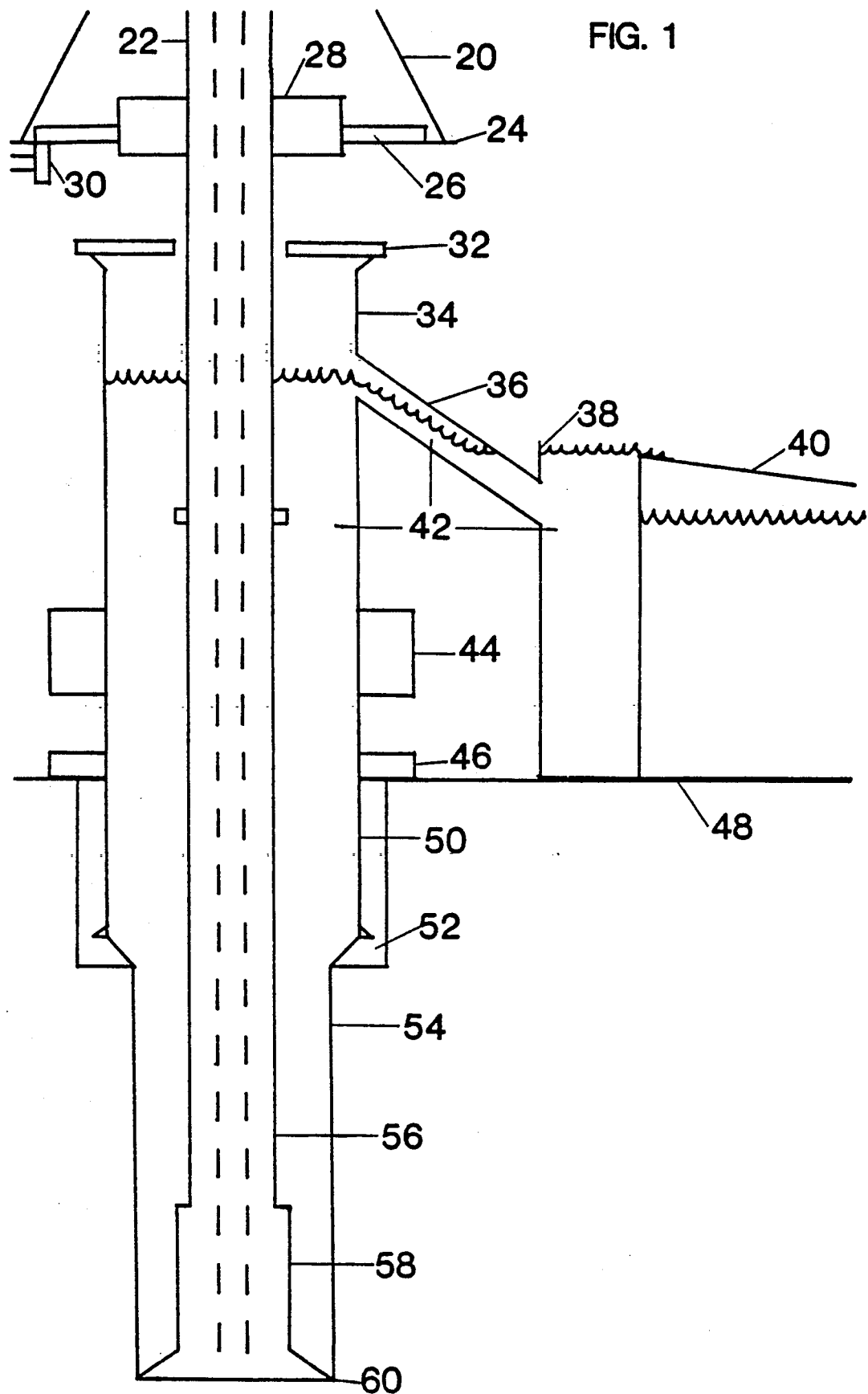
FIg. 1 is a representational plan of the rotary drilling system with which the present invention may be utilized.

Referring to FIG. 1, a mast 20 is located over the bore hole 54 being drilled in the earth by rotary drilling. A drill stem, which consists of a kelly 22, drill pipe 56 and drill collars 58, is connected to a drill bit 60 and is suspended within the bore hole 54. A prime mover (not shown) turns the rotary table drive 30, which turns the rotary table 26 and the kelly bushing 28. A long fluted or polygonal shaped axle called the kelly 22 is attached to the drill pipe and causes the drill pipe, drill collars and drill bit 60 to rotate. A hoisting mechanism consisting of a draw works, crown block, travelling block, hook, swivel and drilling lines (not shown) enable the drill stem and drill bit 60 to be raised and lowered by raising or lowering the kelly 22. During most drilling operations one or more strings of casing 50 are installed and cement 52 is placed about the casing 50. The blow out preventer 44 is attached to the drilling spool 46, which is attahced to the top of the casing 50. The drilling nipple 34 is set atop the blow out preventer 44 and the mud return line 36 tees off the drilling nipple 34. The mud return line 36 ends at the shale shaker box 38. Stripping rubbers 32 are placed atop the drilling nipple 34 to wipe drilling mud from the outside of the drill stem while it is being hoisted from the bore hole 54.

The drilling mud system circulates drilling mud 42 from the mud tanks 48 through the following equipment, which is not shown in FIG. 1, mud pumps, stand pipe, rotary hose, goose neck and swivel. The swivel channels drilling mud 42 into the hollow center of the kelly 22. From there the drilling mud 42 flows into the drill pipe 56 and drill collars 58 and then through the drill bit 60. The drilling mud 42 exits the drill bit 60 and travels up the annular space between the bore hole 54 and the outside of the drill stem. While traveling this span the drilling mud 44 entrains rock chips, caving, gas, oil, water and other material which is produced by the drilling process. The drilling mud 42 continues up the annular space between the casing 50 and the outside of the drill stem. At the earth's surface the drilling mud 42 circulates in the annular space between the drilling spool 46 and the drill stem, then the annular space between the blow out preventer 44 and the drill stem, then the annular space between the drilling nipple 34 and drill stem. Near the top of drilling nipple 34 the drilling mud 42 makes an abrupt turn into the mud return line 36. Then the mud flows down the sloping mud return line 36 into the shale shaker box 38 and into the mud tank 48. Solid material in the drilling mud 42 is separated by means of a screen above the mud tank 48 called the shale shaker 40.

Figure 2:
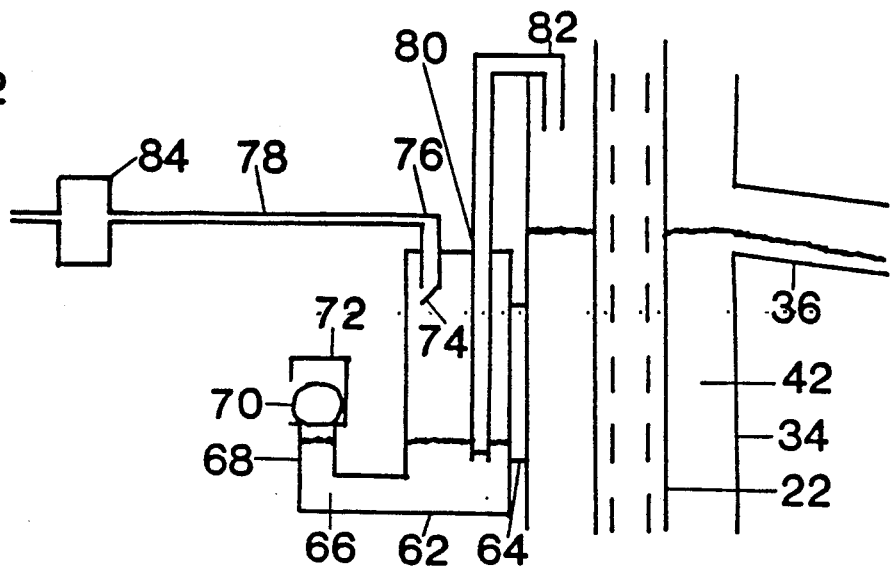
FIG. 2 illustrates equipment used in the present invention to sample the gas entrained in the drilling mud, separate any drilling mud or other material which may be entrained in the gas sample and draw the gas sample to a gas analyzer FIG. 3 through FIG. 6 illustrates some possible configurations of the gas sample tube.

It is the intent of this invention, as shown in FIG. 2, to use to advantage the natural turbulence in the drilling mud 42 caused by the abrupt turn of the drilling mud 42 from the drilling nipple 34 into the mud return line 36, and the agitation provided by the rotating drill stem in the annular space between the drilling nipple 34 and the drill stem. The physical properties of the gases entrained in the drilling mud 42 also are used to advantage in this invention. Also, the warm drilling mud which circulates in the annular space will be used in this invention to advantage. None of the prior art has used this novel approach.

In the typical drilling operation, as shown in FIG. 2, three hundred gallons a minute of drilling mud 42 travels in the annular space bounded by an eleven inch diameter drilling nipple 34 and a five inch diameter fluted or polygonal shaped kelly 22. The kelly 22 typically rotates at fifty to three hundred revolutions per minute. Rotation is typically not stopped except when the drilling mud pumps and thus drilling mud circulation is stopped. The typical gas found while drilling for oil, gas and coal is methane. Methane is eighty percent or more of the gas detected by gas analyzers. Methane is lighter than air at the pressure and temperature conditions found above the drilling mud 42 surface at the drilling nipple 34. The agitation of the drilling mud 42 caused by the abrupt turn and the rotation of the drill stem in the drilling nipple 34, coupled with the fact that methane is lighter than air offer a unique combination which allows for gas sampling without a conventional gas trap.

The earth tends to be warmer towards its center. In typical drilling operations the earth is one degree Fahrenheit warmer per hundred feet of depth. The drilling mud 42 circulated to the surface is heated. Generally the drilling mud 42 at the surface from a five thousand foot well is over one hundred degrees Fahrenheit. Placing the gas sampling tube 82 and separation device 62 near the drilling nipple 34 prevents freezing.

Refer to FIG. 2 for an overview, a gas sampling tube 82 is placed in and near the top of the drilling nipple 34. The gas sample is drawn into the gas sampling tube 82 by means of the pump 84 downstream of the separation device 62. If any drilling mud 42, other liquid debris or solid debris is drawn into the gas sampling tube 82 it is separated from the gas sample by gravity settling in the separation device 62. The liquid debris is expelled from the separation device 62 through an exit line 68.

Figure 3:
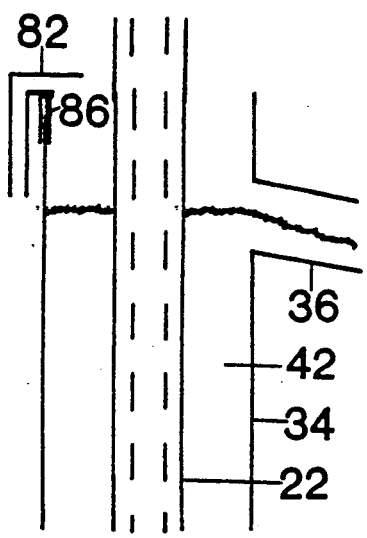
Figure 4:
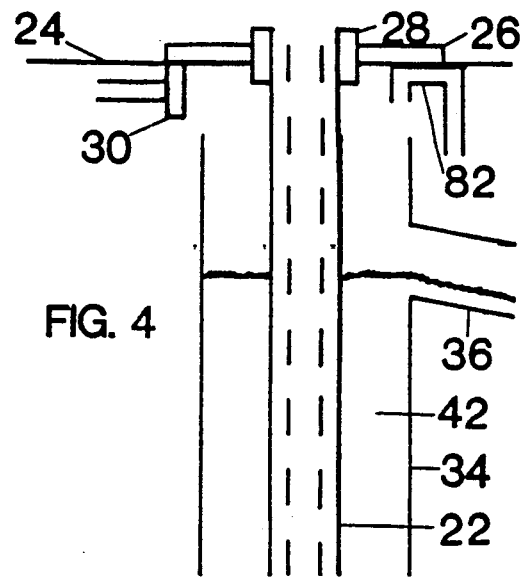
Figure 5:
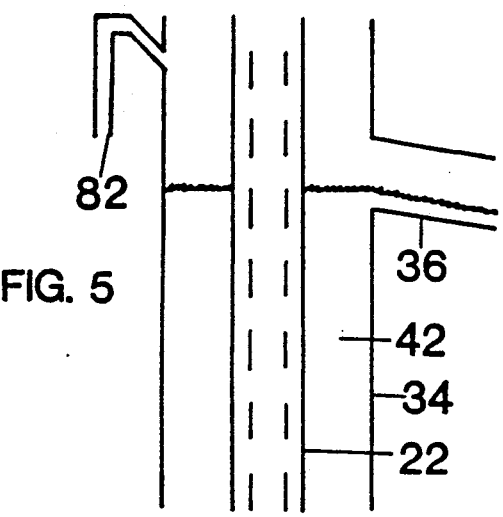
Figure 6:
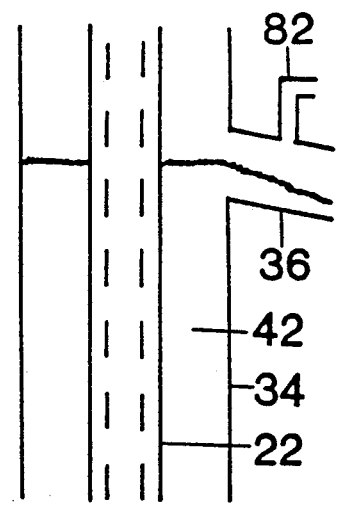

In the preferred embodiment, the gas sampling tube 82 is placed on the inside wall and near the top lip of the drilling nipple 34 (see FIG. 3). The gas sampling tube 82 is designed so that it is not hit, struck or rubbed by the drill stem. In an alternative embodiment, the gas sampling tube 82 is placed below the drilling floor 24 above the drilling nipple 34 (see FIG. 4). In another alternative embodiment (see FIG. 5) the gas sampling tube 82 is placed in the wall of the drilling nipples 34. This usually requires cutting a hole or tapping the drilling nipple 34. In another alternative embodiment the gas sampling tube 82 is placed in the wall of the mud return line 36 near the drilling nipple 34 (see FIG. 6). This usually requires cutting a hole or tapping the mud return line 36. Placement of the gas sampling tube in, out, above, or about the drilling nipple 34 may be necessary depending on the configuraton of the drilling nipple 34.

The gas sampling tube 82 may constructed of any solid material, however solid materials with low specific gravities and which are easily abraded are used. Low specific gravity materials and easily abraded materials are used to prevent the sampling tube 82 from sinking in the drilling mud 42 and falling down the bore hole 54. Plastic, rubber and wood have been used to construct the gas sampling tubes 82. In the unlikely event that part or all of the gas sampling tube 82 falls into the drilling nipple 34 the drilling mud 42 carries it into the mud return line 36.

The gas sampling tube positioner 86, shown in FIG. 3, keeps the gas sampling tube 82 securely fastened and positioned. Tape is used to secure the gas sampling tube positioner 86 to the drilling nipple 34. The gas sampling tube positioner 86 is incorporated into the design of the gas sampling tube 82 in alternative embodiments. In FIG. 7, the gas sampling tube 82 incorporates a channeling device 88 which reduces the amount of air from entering the space in the drilling nipple 34 and prevents the gas liberated from the drilling mud 42 from escaping. This channeling device 88 is a cap placed over the upper lip of the drilling nipple 34 with an opening in the center of the cap which allows the drill stem to enter. FIGS. 8 and 9 illustrate the channeling device when the gas sampling tube 88 is placed in the drilling nipple 34 and mud return line 36, respectively. The channeling device 88 in alternative embodiments is secured to the drilling nipple 34. A channeling device fastener 94 (see FIG. 11) is secured at one end to the circumference of the channeling device 88 at various points and, at the other end is attached to the outside of the drilling nipple 34.

In the alternative embodiments which employ the channeling device 88, the channeling device is constructed from a solid, low specific gravity, flexible and elastic material such as rubber or plastic. The material in the channeling device 88 may be subjected to striking, rubbing and hitting by the motion of the drill stem and kelly 22. The channeling device 88 should be elastic enough to accommodate the withdrawl and entry of the drill bit 60.

The gas in the gas sampling tube 82 flows into a separation device 62 which separates any drilling mud, other liquid debris and solid debris which may enter the gas sampling tube 82. FIG. 10 is a cross sectional representation of the preferred embodiment. The separator inlet line 80, which at one end is attached to the gas sampling tube 82, enters the top of the separation device 62 and extends to near the bottom of the separation device 62. A separator outlet line 76 extends down a short distance from the top of the separation device 62. The other end of the separator outlet line 76 is connected to the gas sample line 78. Baffles 74 (see FIG. 2), screens and diverters are placed to prevent any entrained mud from entering the separator outlet line 76. In FIG. 10, at the base of the separation device 62, is an exit line 68 which allows solid and liquid debris to exit the separation device 62. The base of the separation device 62 is filled with water 66 to a depth sufficient to fill the exit line 68. A liquid drying agent such as ethylene gycol is substituted for water 66, if excessive gas simple line 78 condensation is a problem. The top of the exit line 68 is fitted with a mechanical sealing device such as a flapper valve 92 (see FIG. 10) or a ball 70 and cage 72 arrangement (see FIG. 2). Mechanical sealing devices will prevent air from entering the exit line 68, if water 66 or the other liquid, which offer an air tight seal is drained or expelled from the separation device 62.

The separation device 62 is attached to the drilling nipple 34 or blow out preventer 44 by means of a separator fastener 64 (see FIG. 2). This placement is not intrusive and the heat radiating from the hot drilling mud 42 prevents drilling mud 42 or water 66 in the sample tube 82 or separation device 62 from freezing.

The gas sample flows into the gas sampling tube 82, through the separation device 62, through the gas sample line 78 and to the gas analyzers by the creation of a pressure which is lower in the gas sampling tube 82 than the area about it. In the preferred embodiment (see FIG. 2) a pump 84 is placed downstream and is connected to the separation device 62 by means of a gas sample line 78 of sufficient length ot keep the pump 84 away from the drilling nipple 34. If the pump 84 failed or sparked it would not cause the gas about the drilling nipple 34 to ignite.

An alternative embodiment (see FIG. 11) places a purge line 96 above and downstream of the drilling spool 46 and up steam of the shale shaker box 38, preferably in the drilling nipple 34. The purge line 96, by forcing gas into the drilling nipple 42 raises the pressure in the drilling nipple 34. The gas which is liberated from the drilling mud 42 flows toward the lower pressure at the gas sampling tube 82 inlet. The purge line 96, also, agitates the drilling mud 42, which helps liberate the entrained gas from the drilling mud 42. The gas used in the purge line 96 is any gas which will not interfere with the detection of gas in the gas analyzer. Compressed nitrogen or air are recommended purge gases.

While my above description contains many specificities, these should not be construed as limitation on the scope of the invention, but rather as an exemplification of embodiments thereof. For example the gas sample tube 82 may be circular, square, or rectangular. The channeling device 88 may be conical rather than a cap in shape. The baffles 74 in the separation device 62 may be omitted. The pump 84 and the purge line 96 may be run simultaneously. Accordingly, the scope of the invention should be determined not by the embodiment(s) illustrated, but by the appended claims and their legal equivalents.

What is claimed is:

1. A device for gathering gas which evolves from the drilling mud exiting a well bore, comprising:
    a gas sampling tube located such that entrained gas which evolves into the atmosphere as the drilling mud exists a well bore impinges upon an inlet of said sampling tube;
    a means which creates a lower pressure at the inlet of said sampling tube than the atmosphere about said sampling tube causing said gas to enter said sampling tube and flow to gas analyzers.

2. A device according to claim 1, wherein the inlet of said sampling tube is placed above said drilling mud and in an area downstream and above the blow out preventer, upstream of the shale shaker box, and below the top of the drilling nipple.

3. A device according to claim 1, wherein the inlet of said sampling tube is placed about said drilling nipple.

4. A device according to claim 1, further including a channeling device comprising;
    a cap placed atop said drilling nipple such that said gas is channeled toward the inlet of said sampling tube
    a means which allows the drill stem and drill bit to travel through said cap.

5. A device according to claim 4, wherein said channeling device is a rotating head.

6. A device according to claim 1, further including a separation device, wherein any non gaseous material entrained in said gas is removed by a container which has an inlet line which is connected to said sampling tube and extends further down in said container than a outlet line which allows said gas to flow to gas analyzers.

7. A device according to claim 6, wherein said non gaseous material is removed through an exit containing a liquid seal which prevents air about said container from entering said container.

8. A device according to claim 6, wherein said non gaseous material is removed through an exit containing a mechanical seal which prevents said air from entering said container.

9. A device according to calim 1, wherein said means which creates lower pressure at the inlet of said gas sampling tube is a pump placed downstream of the inlet of said gas sampling tube.

10. A device according to claim 1, wherein said means which creates lower pressure at the inlet of said gas sampling tube is a device which forces purge gas into an area downstream and above the drilling spool, upstream of the shale shaker box, and below the top of said drilling nipple.

11. A device according to claim 10, wherein said purge gas agitates said drilling mud.

12. A method of sampling a gas comprising the following steps;
   placing a sampling tube, having an inlet, such that said gas exiting a well bore impinges upon said sampling tube inlet
   drawing said gas through a conduit to a gas analyzer.

13. A method according to claim 12, further including a method to remove a non gaseous material entrained in said gas.

14. A method according to claim 12, further including a method to channel said gas toward said sampling tube inlet and impede the entrance of the atmosphere outside said drilling nipple.

15. A method according to claim 12, further including a method to agitate a drilling mud by the introduction of said gas into an area downstream and above a drilling spool, upstream of the shale shaker box, and below the top of a drilling nipple.

* * * * *